United States Patent [19]

Giatti

[11] Patent Number: 4,726,173
[45] Date of Patent: Feb. 23, 1988

[54] AUTOMATIC PACKAGING MACHINE

[75] Inventor: Filippo Giatti, S. Lazzaro di Savena, Italy

[73] Assignee: Newpack S.p.A., Bologna, Italy

[21] Appl. No.: 914,967

[22] Filed: Oct. 3, 1986

[30] Foreign Application Priority Data

Oct. 4, 1985 [IT] Italy .................... 12576 A/85

[51] Int. Cl.⁴ .................... B65B 47/04; B65B 47/08; B65B 47/10; B65B 41/14
[52] U.S. Cl. .................... 53/559; 53/389
[58] Field of Search .................... 53/559, 51, 389, 329, 53/453, 560

[56] References Cited

U.S. PATENT DOCUMENTS

| | | | |
|---|---|---|---|
| 3,126,681 | 3/1964 | Cloud | 53/559 X |
| 3,530,636 | 9/1970 | Weprin et al. | 53/559 X |
| 3,808,772 | 5/1974 | Turtschan | 53/559 X |
| 3,958,394 | 5/1976 | Mahaffy et al. | 53/559 X |
| 4,069,645 | 1/1978 | Vetter | 53/559 X |
| 4,094,127 | 6/1978 | Romagnoli | 53/559 X |
| 4,217,163 | 8/1980 | Utzmann et al. | 53/51 X |

Primary Examiner—Horace M. Culver
Attorney, Agent, or Firm—Pollock, Vande Sande & Priddy

[57] ABSTRACT

In a machine for making sealed containers such as blister packages, the continuous feeding of the films (1, 7) for the formation and sealing of the containers is effected alternately by at least one unit of side clamping grippers (13) and by a unit comprising the stations operating cyclically on the films, namely, a heating station (3), a container-forming station (4), a sealing station (6) and a cutting station (8). The grippers and stations are movable on rectilinear guides (11, 12) disposed parallel to the path of travel of the films, and the operative units are reciprocated over the guides by a mechanism comprising a single cylindrical cam (24) having a closed helical outline of profile that is followed by two cam-followers (21-21') angularly spaced 180° from each other and slidable on stationary guides p parallel to the axis of the cam. The length of the cam profile that causes the advancing movement of the stations or grippers, and consequently the feeding movement of the films, has an angular extent larger than the length of the profile that causes the reverse movement of the operative units, whereby the latter operate together and synchronously during a fraction of the advancing stroke and whereby said films are engaged at all times by either one of said operative units when the other one reverses to effect the return stroke.

4 Claims, 3 Drawing Figures

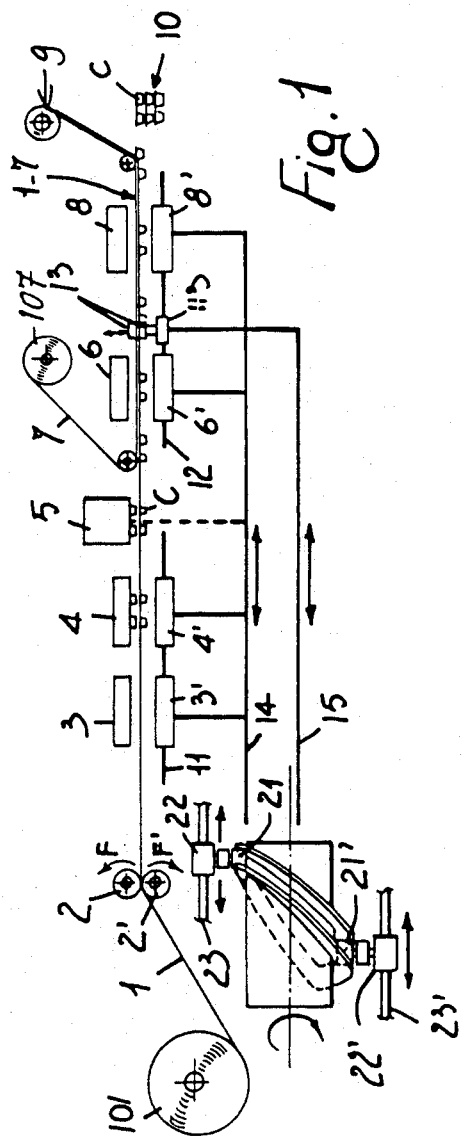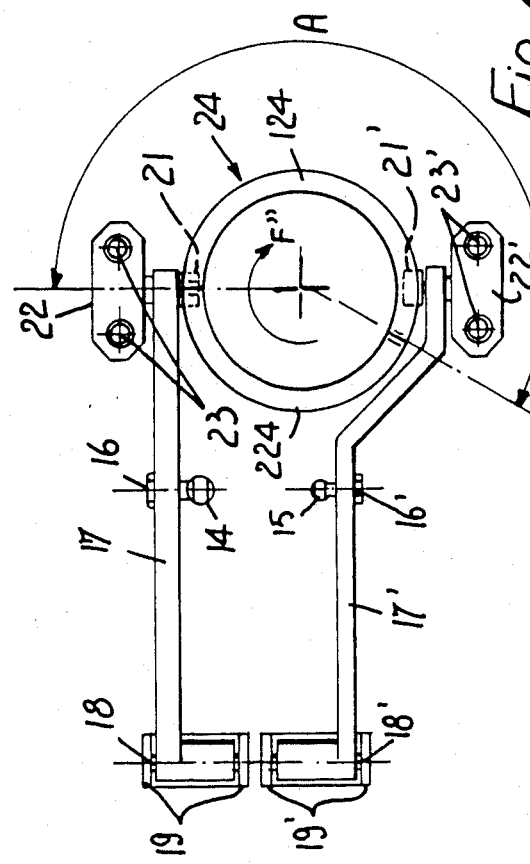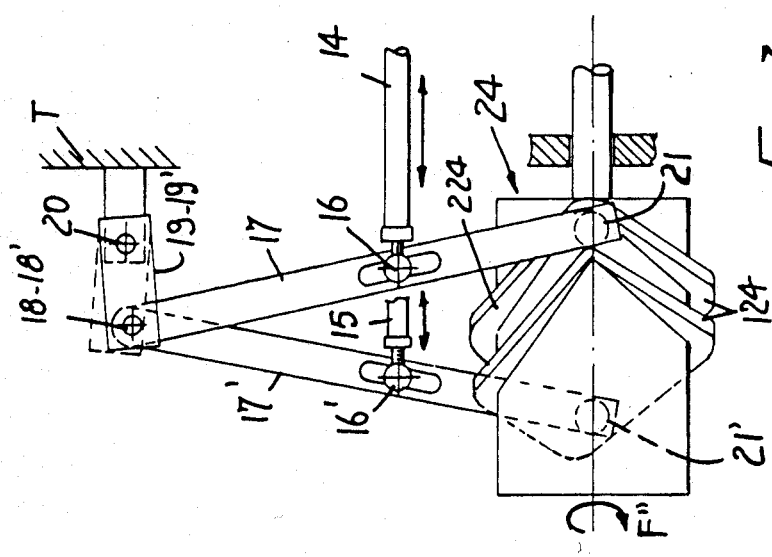

AUTOMATIC PACKAGING MACHINE

FIELD OF THE INVENTION

This invention relates to an automatic machine for the continuous formation, filling and sealing of containers, for example, a machine for making blister packages. Said containers or blisters are formed from a film of thermoplastic material being advanced horizontally along the machine. By the action of stations disposed in single file, said film is successively heated, molded for obtaining said containers, and then filled with a product. A film or foil of heat-sealable material, usually aluminum, is then caused to adhere to the just-filled containers, which are finally separated from each other.

BACKGROUND OF THE INVENTION

Continuously-operating machines of this type, wherein the films for defining and for sealing said containers are advanced continuously, are described, for example, in U.S. Pat. Nos. 3,958,394; 4,069,645 and 4,094,127. This invention relates to a continuously-operating machine of the type specified above, which distinguishes over the known machines due to its simpler construction, easier set-up and higher technological reliability.

SUMMARY OF THE INVENTION

In the machine according to the invention, the thermoplastic film is unrolled continuously from its reel by a pair of suitably powered parallel rollers. The assembly formed by this film and by the succeeding film or foil for sealing said containers is caused to advance continuously by a molding-sealing-cutting unit and by a further unit comprising at least one pair of side grippers said units having a rectilinear, reciprocating, out-of-phase motion so as to act alternately in gripping and advancing said assembly. More particularly, said stations and grippers are moved together along a portion of their advancing path of travel, so that, when either one of them is opened to reverse its movement and return to its rest position, the other one is already gripping the films which, therefore, are advanced continuously. The speed of the linear travel of said stations and grippers is the same as the peripheral speed of said pair of rollers for unrolling the thermoplastic film. The stations and grippers are reciprocated by a mechanism comprising a cylindrical cam having a closed helical profile that is followed by two cam-followers angularly spaced 180° from each other and movable on stationary guides parallel to the axis of said cam. The profile of said cam is such as to cause said stations and grippers to travel together and synchronously during a portion of their advance stroke so that when one of these units reverses its movement, the other unit is already gripping the films.

BRIEF DESCRIPTION OF THE DRAWINGS

Further features of the invention, and the advantages resulting therefrom, will be apparent from the following description of a preferred embodiment thereof, shown in the accompanying drawings, in which:

FIG. 1 is a diagrammatic side elevational view of a machine for making blister packages, provided with the apparatus of the invention;

FIG. 2 is a side elevational view of the apparatus;

FIG. 3 is a front view of the apparatus.

DESCRIPTION OF THE PREFERRED EMBODIMENT

With reference to FIG. 1, numeral 1 indicates a film of thermoplastic material which is unrolled from its reel 101 by a pair of parallel feeding rollers 2-2' having a continuous and constant rotary motion in the direction shown by the arrows F-F'. The numerals 3-3' indicate the two components of the heating station to heat the film up to a plasticity status so that, at the next operative station 4-4', the open-top containers or pockets C may be molded therein. At the filling station 5 a product is introduced into the pockets C. The numerals 6-6' indicate the components of the heat-sealing station at which a film or foil 7 of either plastic or aluminum, unrolled from a reel 107, is caused to adhere to the film 1 to close said containers C. Finally, 8-8' indicate the components of the cutting station to sever the sealed packages containing the product from the assembly 1-7. Indicated at 9 is the scrap-collecting station, and indicated at 10 is the station where the filled and sealed packages are collected.

According to the invention, the stations 3-4-6-8, and optionally the product feeding station 5, are mounted on horizontal stationary guides 11-12 parallel to the path of travel of the film 1. Also mounted on the guides 12 is a longitudinally slidable slide 113 provided with at least one pair of grippers 13 that, on command, can grip the film assembly 1-7 at the longitudinal edges thereof. These grippers may be operated pneumatically and are not described here in detail, since they may be easily designed by those skilled in the art. According to the invention, said movable stations are mechanically connected to each other and to an actuating rod 14, while the slide 113 for the grippers 13 is connected to an actuating rod 15, said rods being connected to a source of rectilinear alternative movement operating as follows. When the rod 14 is moved rightwards (looking at FIG. 1), the rod 15 is moved leftwards. During this step, the grippers 13 are opened are returned to their rest position, while said operative stations are closed, i.e., clamped, and advance the films 1-7. Before the rod 14 reaches the end of its advance stroke, the rod 15 reverses its movement and starts moving rightwards at the same speed as the rod 14. During this step, the grippers clamp the edges of the films 1-7 while they are still being moved by the movable operative stations of the machine; successively, these stations will be opened and will be moved leftwards to their original position by the rod 14. Similarly, before the grippers 13 reach the end of their rightward stroke, the rod 14 reverses its movement and moves said operative stations rightwards whereby they will take over synchronously in gripping and advancing said films before the latter are released from the grippers 13 now reversing to their rest position. The linear speed of the rods 14, 15 is the same as the peripheral speed of the feeding rollers 2, 2', whereby the length of film 1 downstream of said rollers will not be submitted to any tension.

The timed reciprocation of the rods 14-15 is effected by an apparatus which, as shown also in the FIGS. 2 and 3, foresees an adjustable connection 16-16' of said rods with an intermediate point of two levers 17-17' one end of which is pivoted at 18-18' to respective links 19-19' which, in turn, are pivoted to a common vertical shaft 20 fixed to the frame T of the machine.

The other end of the levers 17-17' is provided with cam follower rollers 21-21' which are angularly spaced 180° from each other and the axis of which preferably disposed in a common vertical imaginary plane. The axis of the rollers 21-21' is parallel to the axis of said pivotal connections 16-16-'-18-18' and pivot 20. The levers 17-17' are pivoted, in axial alignment with said rollers 21-21', to respective slides 22-22' which are slidable on stationary rectilinear guides 23-23' which are disposed parallel to each other and to the axis of a cylindrical cam 24 rotatably supported by the frame of the machine and connected to an adjustable-speed motor unit (not shown) to be rotated thereby continuously and at constant speed, for example, in the direction indicated by the arrow F". The axis of the cam 24 is parallel to the path of travel of the film and is disposed in the same imaginary vertical plane containing the axis of said rollers 21-21' which co-operate with the helical closed profile of this cam.

It will be noted in the FIGS. 2 and 3 that length of the cam profile 124 that causes the advancing movement of either the stations or the grippers, in the feeding direction of the films 1-7, has an angular amplitude A which is larger than that of the length of the profile 224 that causes the reversing movement of said units, the arrangement being such that the stations and grippers have a common, synchronized portion of advance storke, whereby when one of the units reverses to effect its return stroke, the other unit is already gripping the films. Finally, the apparatus comprises means to detect the operative position of the cam 24 or of some other member of said mechanism to effect at the right time, through servo-controls, the opening and closing movements of the grippers 13 and movable operative stations of the machine. Such a means is not shown in the drawings, in that it can be easily conceived and constructed by those skilled in the art.

As shown in FIG. 1, the cam 24 is disposed, preferably, at the initial portion of the machine so that, advantageously, the drive for properly activating the pair of rollers 2-2' can be derived from said cam or its actuating means.

The simple construction and operative precision of the apparatus described above is now apparent. Due to the adjustability of the pivotal connection 16-16' between the rods 14-15 and the levers 17-17', the extent of the stroke of the movable stations and grippers 13 of the machine may be varied at will, and said mechanism requires no highprecision machining. It is to be understood that many changes and modifications, especially of constructional nature, may be made to the apparatus described above. For example, the rods 14-15 could be connected directly to the slides 22-22' without the intermediary of the levers 17-17'.

What is claimed is:

1. An automatic machine for the continuous packaging of articles into containers which are thermoformed from a thermoplastic film (1) and are sealed by a sealing filme (7) of heat-sealable material, both of said films having a path of travel, said machine comprising
    (a) operative stations comprising
        (i) a thermoforming station (4) at which cavities or pockets (C) for containing the articles are formed in the thermoplastic film;
        (ii) a filling station (5) at which the articles are introduced into the formed cavities (C);
        (iii) a heat sealing station (6) at which the sealing film (7) is sealed to close the cavities filled with articles; and
        (iv) a cutting station (8) at which the thus obtained filled and sealed containers are separated from one another;
    (b) said operative stations (4, 5, 6, 7, 8) being movably mounted on rectilinear guides (11, 12) which are parallel to the path of travel of the films (1, 7);
    (c) said operative stations gripping the film at each operative cycle and moving together with the gripped film in a direction of advancement of the machine, and releasing the film prior to starting the reverse movement back to the initial point of their operative cycle;
    (d) there being at least one gripper device (13) movably mounted on said rectilinear guides for gripping the longitudinal edges of said films (1, 7), to grip the films and move in said direction of advancement while the operative stations effect their reverse movement and to release the film and return to their initial position while the operative stations grip the film and move in said direction of advancement;
    (e) a cylindrical cam (24) for producing alternative movement in opposite directions of said operative stations (4, 5, 6, 7, 8) and said gripper device (13), said cam having its axis parallel to said rectilinear guides (11, 12) and a groove (24, 124) engaged by two cam followers (21, 21') angularly spaced at 180° from each other, one of said cam followers (21, 21') being connected to the operative stations (4, 5, 6, 7, 8) and the other cam follower being connected to the gripper device (13).

2. An automatic machine according to claim 1, wherein said groove has a path comprising a first section (124) for controlling the advancement movement of the operative stations and of the gripper device, said first section having an angular amplitude which is greater than the angular amplitude of a second section (224) of said path, for controlling the reverse movement of the operative stations and of the gripper device in such manner that said operative stations and said gripper device present a common and synchronized portion of their advancement movement, whereby when either one of the units consisting of the operative stations and said gripper device present a common and synchronized portion of their advancement movement, whereby when either one of the units consisting of the operative stations and the gripper device releases the film for effecting its backward movement, the other unit has already gripped said film in advance of said release.

3. An automatic machine according to claim 1, wherein the two cam followers (21, 21') are connected to slides (22, 21') movable on fixed guides (23, 23') parallel to the rectilinear guides (111, 12), each of said slides having articulated thereon one end of a lever (17, 17') the other end of which is articulated to the machine frame (T), each of said levers (17, 17') having articulated at an intermediate, adjustable hinge point (16, 16') a tie rod (14, 15), the first tie rod (14) controlling the movement of the operative stations (3, 4, 5, 6, 7, 8) while the second tie rod (15) controls the movement of the gripper device (13).

4. An automatic machine according to claim 1, comprising a pair of powered feed rollers (2, 2') having a constant peripheral speed equal to the speed of the operative stations and of the gripper device during their advancing movement, said feed rollers feeding the thermoplastic film (1) to the operative stations (4, 5, 6, 7, 8).

* * * * *